United States Patent [19]

Sugita

[11] Patent Number: 5,708,658

[45] Date of Patent: Jan. 13, 1998

[54] COMMUNICATION TERMINAL

[75] Inventor: Takehiro Sugita, Kanagawa, Japan

[73] Assignee: Sony Corporation, Tokyo, Japan

[21] Appl. No.: 651,987

[22] Filed: May 21, 1996

[30] Foreign Application Priority Data

May 24, 1995 [JP] Japan ..................... 7-151026

[51] Int. Cl.$^6$ ................................. H04B 7/216
[52] U.S. Cl. ................ 370/335; 370/311; 379/60
[58] Field of Search ................. 370/335, 342, 370/441, 479, 311, 320; 379/58, 59, 60; 455/38.3

[56] References Cited

U.S. PATENT DOCUMENTS

| | | | |
|---|---|---|---|
| 5,247,702 | 9/1993 | Su et al. | 455/34.1 |
| 5,299,228 | 3/1994 | Hall | 370/335 |
| 5,349,630 | 9/1994 | Sointula | 379/58 |
| 5,596,571 | 1/1997 | Gould et al. | 370/335 |
| 5,613,208 | 3/1997 | Blackman et al. | 455/38.3 |

*Primary Examiner*—Wellington Chin
*Assistant Examiner*—Soon-Dong Hyun
*Attorney, Agent, or Firm*—Jay H. Maioli

[57] ABSTRACT

A communication terminal in which the power consumption in an intermittent reception state can be reduced significantly. The state value of a second spread code generating circuit (62) for a next drive is set in a register (73) to operate a timer (70), and the first and second spread code generating circuit (62, 75) and the receiving circuit are stopped and put in a sleep state. Then, if they are driven again by the timeout of the timer, the receiving circuit is operated and the second spread code generating circuit is operated from the state value which has been set in the register. Further, the intermittent receiving circuit (65) for operating the first spread code generating circuit from an initial state is provided. Therefore, in non-reception, the first and second spread code generating means can be stopped, so that the power consumption in an intermittent state can be reduced significantly.

13 Claims, 7 Drawing Sheets

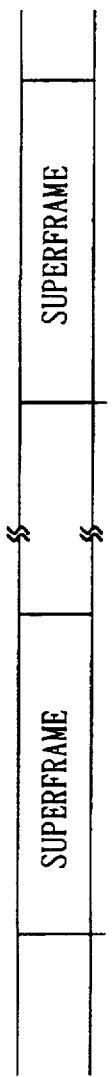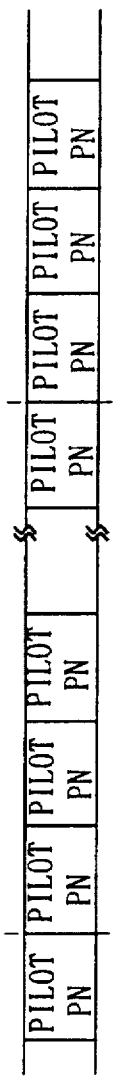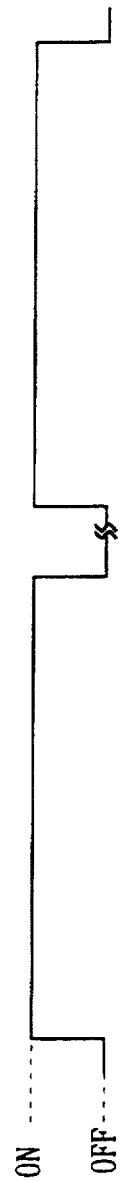
FIG. 4A  SUPERFRAME PERIOD
FIG. 4B  PILOT PN CODE PERIOD
FIG. 4C  TRANSMISSION OF PAGING MESSAGE
FIG. 4D  STATE OF TERMINAL FIG. 8A EN 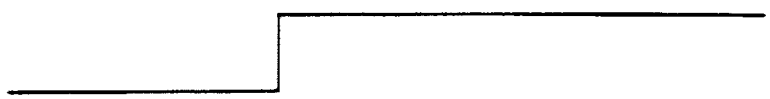
FIG. 8B LD 
FIG. 8C CK 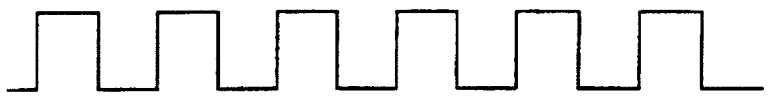
FIG. 8D LONG CODE PN CODE OUTPUT 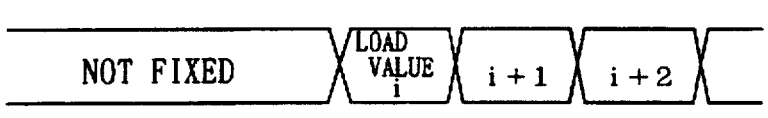

COMMUNICATION TERMINAL

BACKGROUND OF THE INVENTION

1. Field of the Invention

The present invention relates to a communication terminal, and more particularly, is suitable to a mobile terminal equipment of a digital cellular telephone system using code division multiple access (CDMA) technique.

2. Description of the Related Art

Heretofore, in a mobile terminal equipment of a digital cellular telephone system using time division multiple access (TDMA) technique, etc., the power consumption is reduced by the intermittent reception in a waiting time. In the mobile terminal equipment of this system, a receiver is simply powered on or off by a timer to easily execute the intermittent reception because of a relatively flexible time control.

However, in a mobile terminal equipment using the CDMA, there has been a problem that when signal is received from a base station, a strict time control is required such that the timing of a pilot pseudo noise (PN) code or a long code PN code, which is as a spread code, is needed to match up to the timing at the base station side, and the intermittent reception by simply powering on or off can not be executed in a conventional way. Therefore, the mobile terminal equipment using the CDMA has adopted a method such that the intermittent reception is performed without stopping a pilot PN code generator or a long code PN code generator, for example. However, it has been insufficient to reduce the power consumption.

After the pilot PN code generator or the long code PN code generator is stopped, if the timing is immediately matched to the base station side correctly when the generator is operated again, the pilot PN code generator or the long code PN code generator is completely stopped to execute the intermittent reception. Thereby, it can be considered to reduce the power consumption magnificently.

SUMMARY OF THE INVENTION

In view of the foregoing, an object of this invention is to provide a communication terminal which can optimize the power consumption in the intermittent reception.

The foregoing object and other objects of the invention have been achieved by the provision of a communication terminal. In the communication terminal, the state value of a second spread code generating circuit for next drive is set to a register and also a timer is operated. The first and second spread code generating circuits and a receiving circuit are stopped to enter the sleep state. When the receiving circuit is driven again by timeout of the timer, the receiving system is operated, and simultaneously, the second spread code generating circuit is operated from the state value which has been set in the register. Further, an intermittent reception controlling circuit for operating the first spread code generating circuit from the initial state is provided so as to perform the intermittent call reception for call acquirement.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4D are timing charts showing the operation timing in the intermittent call reception;

FIGS. 8A to 8D are timing charts explaining the operation of the long code PN code generator.

DETAILED DESCRIPTION OF THE EMBODIMENT

Preferred embodiments of this invention will be described with reference to the accompanying drawings:

(1) Outline of CDMA Technique

In a digital cellular telephone system using the CDMA, a forward link channel consists of a pilot channel, a sync channel, a paging channel, and a traffic channel. The pilot channel is a channel for transmitting a pilot PN code repeatedly, and is used for obtaining and maintaining the synchronization at the mobile terminal equipment and for reproducing a clock. In addition, communication data is not transmitted through the pilot channel.

Further, the sync channel is used for matching time information, a long code PN code, etc. between the base station and the mobile terminal equipment. Further, the paging channel is used for transmitting the information needed for handing-off, information for calling the terminal equipment in reception, information for assigning the traffic channel, etc.. The traffic channel is used for transmitting the communication data such as voice information.

Figure 1:
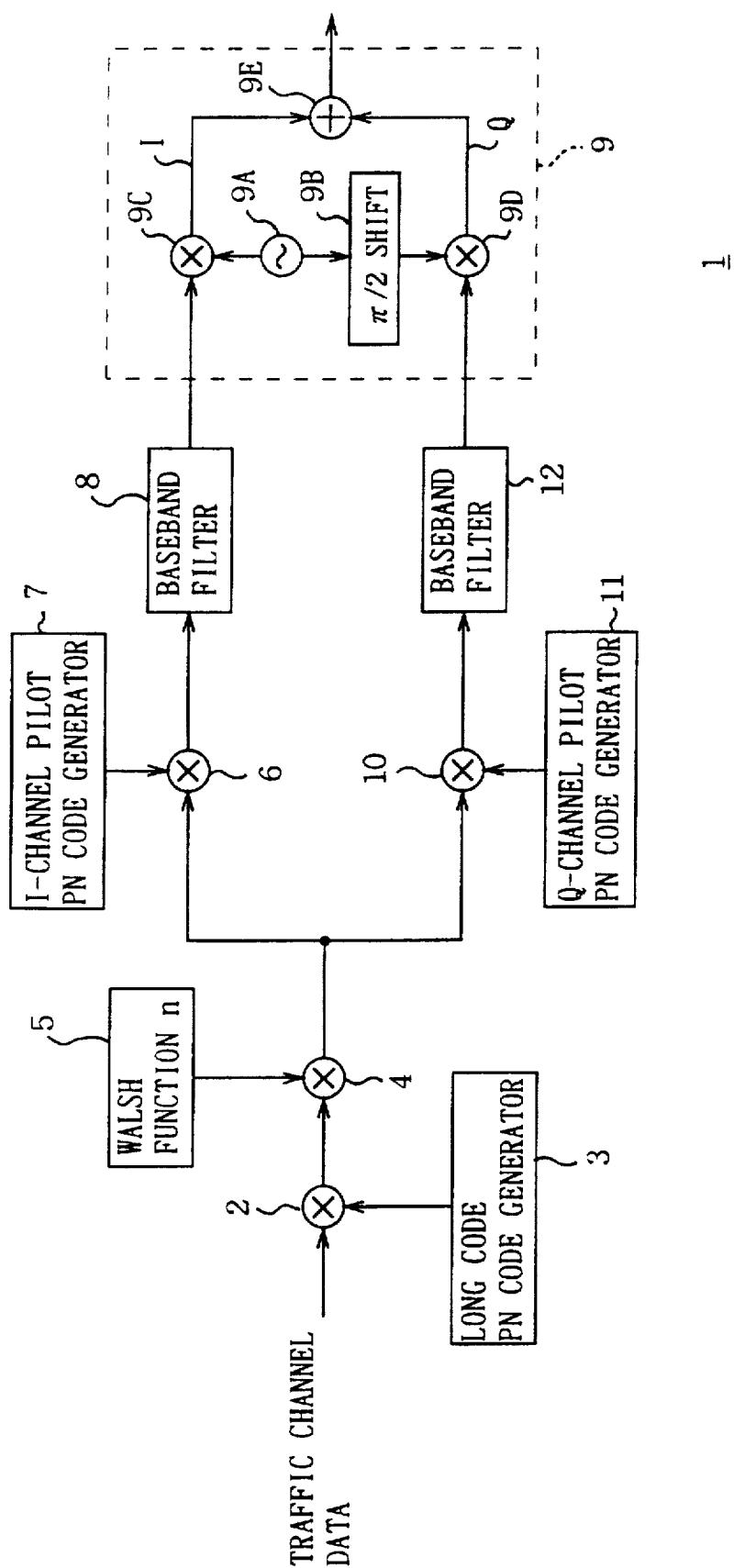
FIG. 1 is a block diagram showing the structure of the transmitting part at a base station side relating to a traffic channel.

FIG. 1 shows the structure of a transmitting part at a base station side regarding the traffic channel. In a transmitting part 1, the traffic channel data is inputted into a multiplier 2 where the data is multiplied with the long code PN code generated at a long code PN code generator 3 and thereafter inputted into a multiplier 4. In the multiplier 4, the inputted data is multiplied with the Walsh code (the number of functions is "n"), for determining a channel, generated at a Walsh function unit 5. The data outputted from the multiplier 4 is inputted into a multiplier 6 where it is multiplied with the pilot PN code generated at an I-channel pilot PN code generator 7. Then, it is bandwidth limited by a baseband filter 8 to be inputted to a quadrature phase shift keying (QPSK) modulator 9.

Meanwhile, the data outputted from the multiplier 4 is inputted into a multiplier 10 where it is multiplied with the pilot PN code generated at a Q-channel pilot PN code generator 11. Then, it is bandwidth limited by a baseband filter 12 to be inputted to the QPSK modulator 9.

The QPSK modulator 9 is composed of an oscillator 9A for generating a carrier wave, a shifter 9B for shifting the carrier wave for π/2, multipliers 9C, 9D, and an adder 9E. The QPSK modulator 9 performs the QPSK modulation based on the inputted in-phase component I and orthogonal component Q. The transmission data outputted from the QPSK modulator 9 is supplied to an antenna (not shown) via a high frequency circuit, etc., to be transmitted.

At a base station side, the decimated code is actually used as a long code PN code, and the spread spectrum is performed by the pilot PN code.

Further, in the digital cellular telephone system using the CDMA, a reverse link channel consists of an access channel and a traffic channel. The access channel is used for controlling the transmission of a call or the reception of a call. The traffic channel is used for transmitting the communication data such as voice information.

Figure 2:
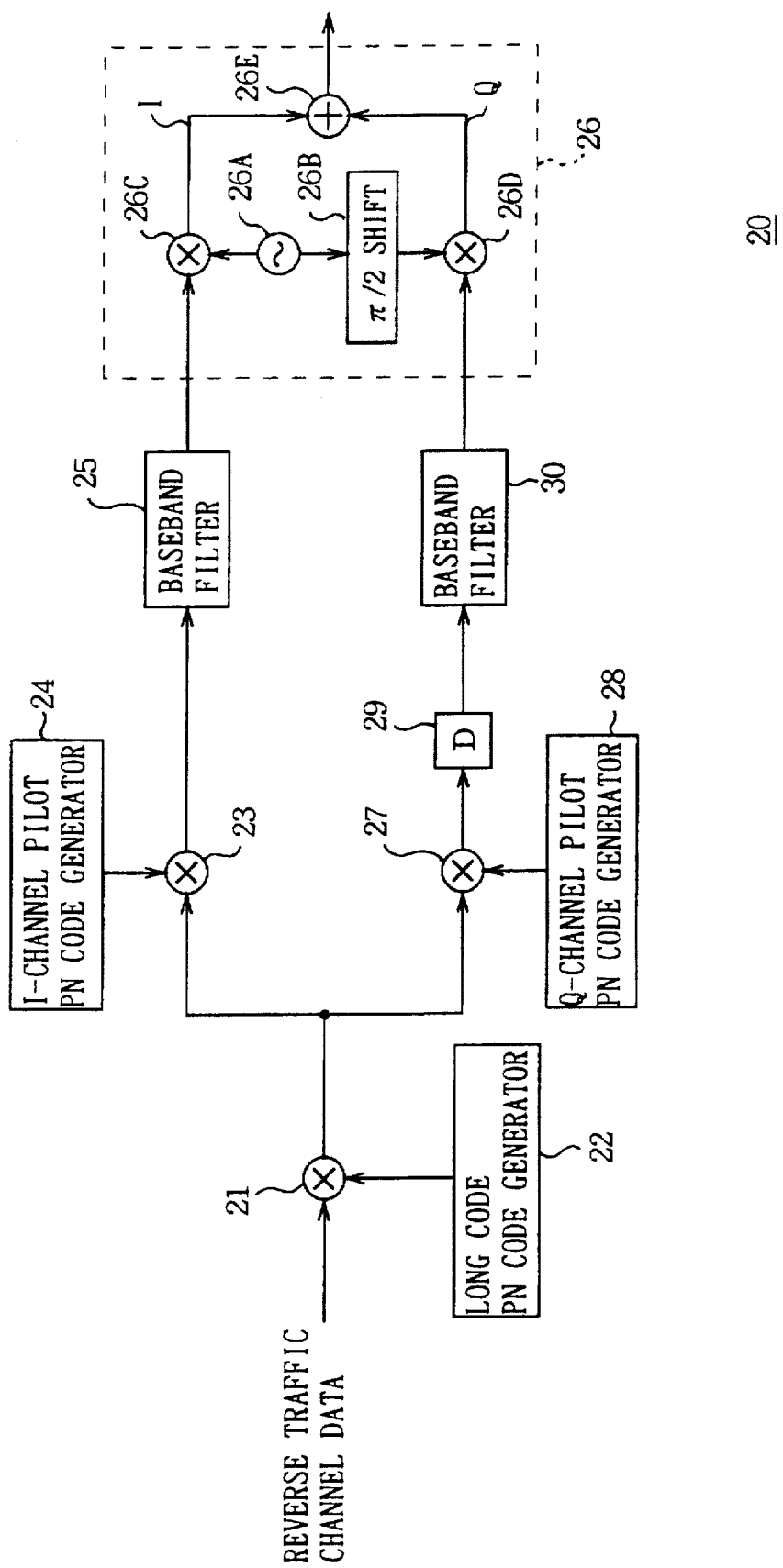
FIG. 2 is a block diagram showing the structure of the transmitting part at a mobile terminal equipment side relating to the traffic channel.

Here, FIG. 2 shows the structure of a transmitting part at a mobile terminal equipment side regarding the traffic channel. In a transmitting part 20, the reverse traffic channel data is inputted into a multiplier 21 where it is multiplied with the long code PN code generated at a long code PN code generator 22. The data outputted from the multiplier 21 is inputted into a multiplier 23 where it is multiplied with the pilot PN code generated at an I-channel pilot PN code generator 24. Then, it is bandwidth limited by a baseband filter 25 to be inputted to the QPSK modulator 26.

Meanwhile, the data outputted from the multiplier 21 is inputted to a multiplier 27 where it is multiplied with the pilot PN code generated at a Q-channel pilot PN code generator 28. Then, it is shifted by a shifter 29 for ½ chips, and is bandwidth limited by a baseband filter 30 to be inputted to the QPSK modulator 26.

The QPSK modulator 26 is composed of an oscillator 26A for generating a carrier wave, a shifter 26B for shifting the carrier wave for $\pi/2$, multipliers 26C, 26D, and an adder 26E. The QPSK modulator 26 performs the QPSK modulation based on the inputted in-phase component I and orthogonal component Q. The transmission data outputted from the QPSK modulator 26 is supplied to an antenna (not shown) via a high frequency circuit, etc., to be transmitted.

At a mobile terminal equipment side, the long code PN code is not decimated while it is decimated at a base station side, and the spread spectrum is performed by the long code PN code.

(2) Structure of Receiving Part of Mobile Terminal Equipment

Figure 3:
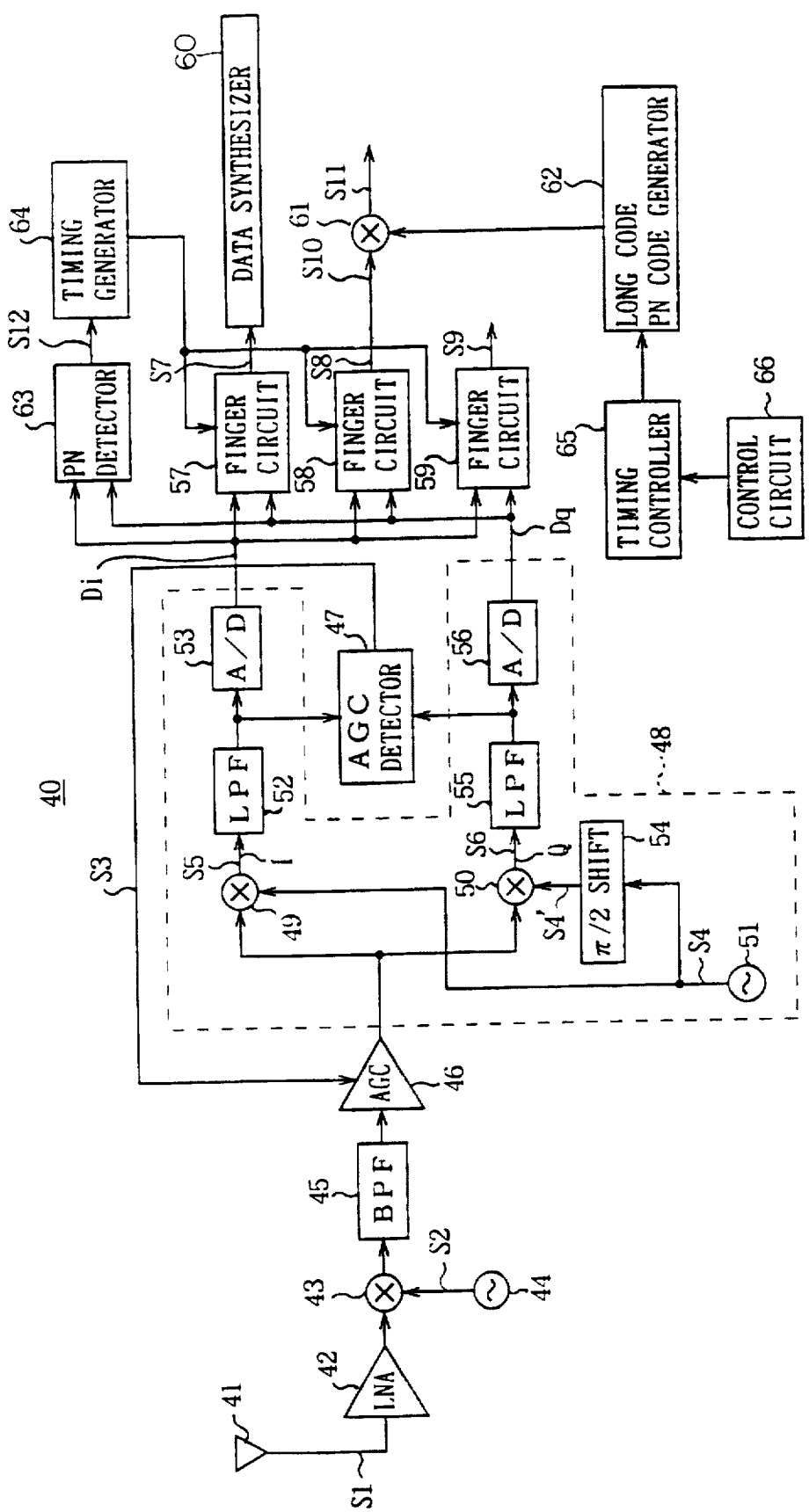
FIG. 3 is a block diagram showing the structure of the receiving part of a mobile terminal equipment side.

FIG. 3 shows the structure of a receiving part at a mobile terminal equipment side. As shown in FIG. 3, in a receiving part 40, a receiving signal S1 received at an antenna 41 is inputted into a low noise amplifier (LNA) 42 where it is amplified, thereafter inputted into a multiplier 43. The multiplier 43 multiplies the receiving signal S1 by an oscillating signal S2 generated at an oscillator 44 to down-convert the receiving signal S1 and it is outputted to a band pass filter (BPF) 45. The inputted receiving signal is bandwidth limited by the band pass filter 45 and is outputted to an automatic gain control (AGC) circuit 46. The AGC circuit 46 is controlled by a control signal S3 outputted from an AGC detector 47 provided at a later stage. The inputted receiving signal is adjusted to a correct gain and is outputted to an orthogonal detecting circuit 48.

In the orthogonal detecting circuit 48, the output of the AGC circuit 46 is supplied to a multiplier 49 and a multiplier 50. The multiplier 49 multiplies the output of the AGC circuit 46 by an oscillating signal S4 generated at an oscillator 51, and outputs the obtained synchronizing component signal S5 to a low pass filter (LPF) 52. The low pass filter 52 removes the unnecessary high frequency component from the synchronizing component signal S5 to output only a baseband signal into an analog-to-digital converter (A/D) 53. The analog-to-digital converter 53 converts the baseband signal into a digital signal with a predetermined sampling frequency to obtain a detecting data Di of the in-phase component.

On the other hand, the multiplier 50 multiplies the output of the AGC circuit 46 by the oscillating signal S4' shifted for $\pi/2$ by a shifter 54. The obtained orthogonal component signal S6 is outputted into a low pass filter (LPF) 55. The low pass filter 55 removes the unnecessary high frequency component from the orthogonal component signal S6 and outputs only a baseband signal into an analog-to-digital converter (A/D) 56. The analog-to-digital converter 56 converts the baseband signal into a digital signal with a predetermined sampling frequency to obtain a detecting data Dq of the orthogonal component.

Thus obtained detecting data Di, Dq are respectively inputted to finger circuits 57 to 59. The finger circuits 57 to 59 are demodulators, which operate each at a different timing to correspond to multipath and demodulate the detecting data Di, Dq. The demodulation data S7 to S9 outputted from the finger circuits 57 to 59 are respectively inputted to a data synthesizer 60 where the timing is matched to each other and they are synthesized to obtain a demodulation data S10. The demodulation data S10 corresponds to the data after the multiplication by the long code PN code at a base station side. Therefore, the demodulation data S10 is inputted to a multiplier 61 where it is multiplied by the long code PN code generated at a long code PN code generator 62, so that a forward traffic channel data S11 transmitted from the base station side is demodulated.

In addition, a PN detector 63 detects the pilot PN code included in the pilot channel, and a timing generator 64 generates a timing signal for controlling the pilot PN code generators in the finger circuits 57 Go 59 based on the detected result S12 of the PN detector 63.

Further, a timing controller 65 controls the timing of the long code PN code generator 62, and controls the whole timing of the pilot PN code generators, etc., of the finger circuits 57 to 59, which is omitted in the figure. The timing controller 65 is controlled by a control circuit 66.

(3) Structure of Timing Controller

In this section in the timing controller, a part of controlling the timing of the pilot PN code or the long code PN code in the intermittent call reception will be explained.

First, FIGS. 4A to 4D show the operation timing of the intermittent operation mode (it is called a slotted operation mode in the digital cellular telephone system using the CDMA). According to the common air interface of this method, a paging (calling) message is transmitted to the mobile terminal equipment with the interval of integer times a superframe (the interval is three times the code interval of pilot PN code).

To receive the paging message, as shown in FIGS. 4A to 4D, the mobile terminal equipment should be re-started somewhat before the head of the paging message. This is because it needs time to operate the stopped circuit and put it in a receivable state.

Figure 5:
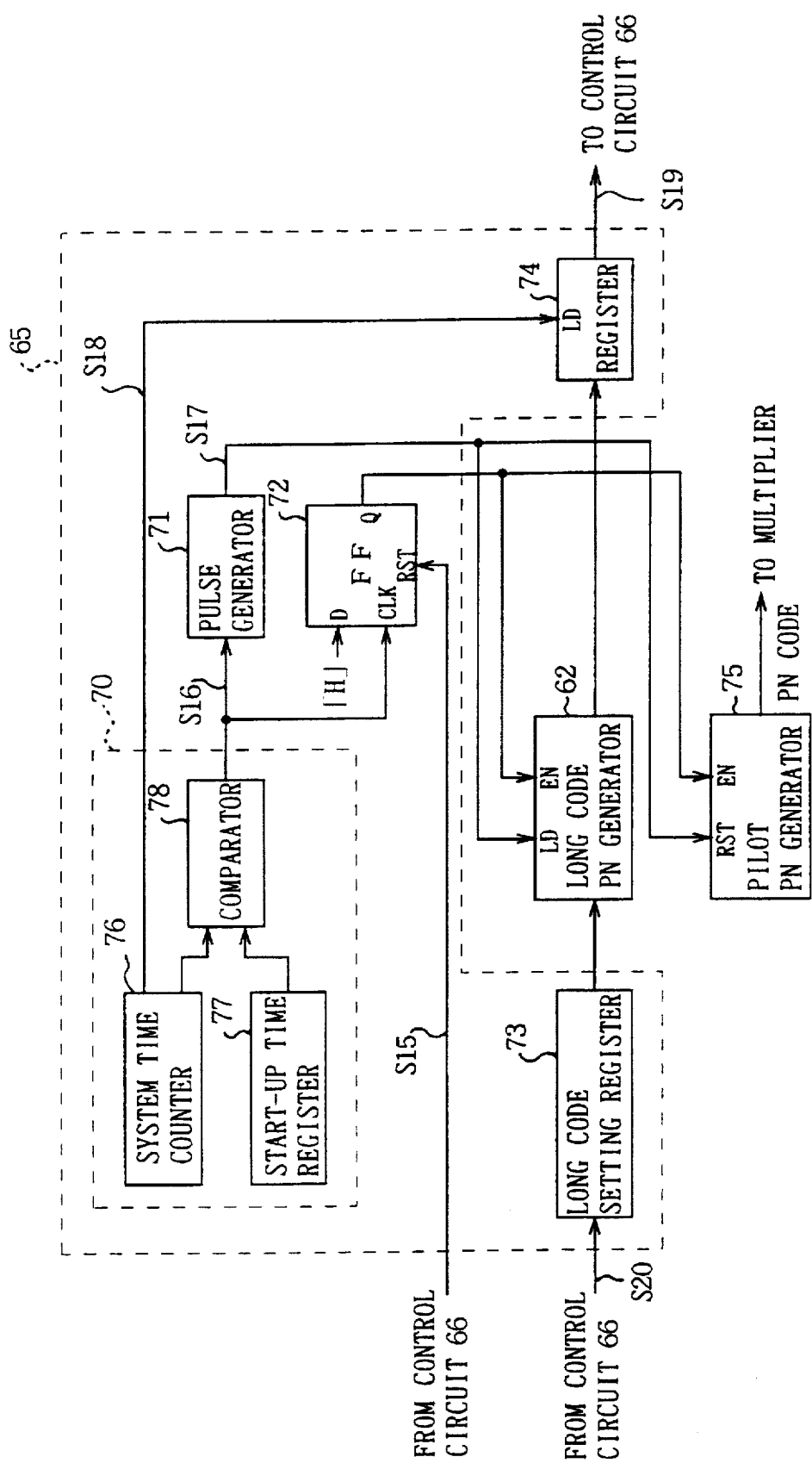
FIG. 5 is a block diagram showing the structure of a timing controller.

Here, FIG. 5 shows concretely the structure of a timing controller. As shown in FIG. 5, the timing controller 65 is composed of a timer 70, a pulse generator 71, a flip-flop (FF) 72, a long code setting register 73, and a register 74.

The flip-flop 72 controls the operation of the long code PN code generator 62 and the operation of each pilot PN code generator 75 in the finger circuits 57 to 59. The output "Q" of the flip-flop 72 is connected to the enable terminal "EN" of the long code PN code generator 62 and pilot PN code generator 75. When the output of the flip-flop 72 is level "H", the long code PN code generator 62 and the pilot PN code generator 75 becomes enabled.

Further, a control signal S15 outputted from the control circuit 66 is inputted to the reset terminal "RST" of the flip-flop 72. When the pulse signal of level "L" is supplied as the control signal S15, the flip-flop 72 becomes a reset state (that is, the state of outputting level "L"), and the long code PN code generator 62 and the pilot PN code generator 75 become disabled to stop the operation.

An output signal S16 outputted from the timer 70 is inputted into the clock terminal "CLK" of the flip-flop 72. Since level "H" has been inputted in a data terminal "D", if the flip-flop 72 is reset once by the control signal S15, thereafter the output signal S16 becomes an active state by timeout of the timer 70, the flip-flop 72 outputs level "H".

Here, the timer 70 is composed of a system time counter 76 for counting the system time, a start-up time register 77 in which the start-up timing value is written, and a comparator 78 for comparing the count value of the system time counter 76 and the start-up timing value. The start-up timing value is set in the start-up time register 77 to start-up the timer 70. When the count value outputted from the system time counter 76 coincides with the start-up timing value which has been written in the start-up time register 77, the output signal S16 in an active state is outputted from the comparator 78 as timeout.

The output signal S16 of the timer 70 is inputted to the clock terminal of the flip-flop 72 as described above, and simultaneously the output signal S16 is inputted to the pulse generator 71. When the output signal S16 becomes an active state, the pulse generator 71 generates a pulse signal S17.

The pulse signal S17 is inputted to the load terminal "LD" of the long code PN code generator 62. Thus, the state value in re-starting which has been previously written in the long code setting register 73 is loaded into the long code PN code generator 62 by the control circuit 66. Further, the output of the flip-flop 72 becomes level "H" as described above, so that the long code PN code generator 62 becomes enabled. Therefore, the long code PN code generator 62 re-starts based on the loaded state value to generate the long code PN code.

Also, the pulse signal S17 outputted from the pulse generator 71 is inputted to the reset terminal "RST" of the pilot PN code generator 75, and the pilot PN code generator 75 is initialized in accordance with the pulse signal S17. Further, the output of the flip-flop 72 becomes level "H" as described above, so that the pilot PN code generator 75 becomes enabled. Therefore, the pilot PN code generator 75 restarts from the initialized state to generate the pilot PN code.

Here, the load signal S18 outputted from the system time counter 76 is inputted to the load terminal "LD" of the register 74. The register 74 takes in the state value of the long code PN code generator 62 in accordance with the load signal S18, and outputs the taken state value S19 to the control circuit 66. At this time, the load signal S18 is outputted with the interval of integer times the code interval of pilot PN code, so that the state value S19 is outputted with the interval of integer times the code interval of pilot PN code.

The control circuit 66 calculates the state of the long code PN code generator 62 for next drive, based on the state value S19 of the long code PN code generator 62 which is read with the interval of integer times the code interval of the pilot PN code. Then, the calculated state value S20 is written in the long code setting register 73. Therefore, the long code PN code generator 62 starts up in next drive based on the calculated state value S20.

Concretely, the state value S19 taken in the register 74 or the state value S20 written in the long code setting register 73 is the state value of each register provided inside the long code PN code generator 62.

Here, the control circuit 66 calculates the state value of the long code PN code generator 62 for next drive, using the multiplication expression of matrix and vector given by the equation:

$$S(i+n)=S(n)\cdot S(i)$$

In the equation, "S(i)" denotes a state of the long code PN code generator 62 being the base (i.e., the state value S19), "S(i+n)" denotes a state of the long code PN code generator 62 for next drive (i.e., the state value S20), and "G(n)" denotes a conversion matrix of the time "n" minutes.

If the state value of the long code PN code generator 62 is periodically read with the interval of the integer times the code interval of the pilot PN code as described above to calculate the state value of the long code PN code generator 62 for next drive from the read state value, G(n) in the equation is needed to be prepared only one time (however, several times is needed depending on a method). If the state value for next drive is calculated from the state value of the long code PN code generator 62 of the arbitrary timing, G(n) is prepared for corresponding number, or the multiplication of matrix should be repeated. Thus, the circuit scale may become large or the processing amount of the control circuit 66 may increase, and this may cause a high power consumption. However, according to the above method, this problem also can be avoided.

(3-1) Structure of System Time Counter

In this embodiment, the interval of the intermittent operation mode is the integer times the code interval of the pilot PN code, and the terminal itself starts up at a timing which is offset for a predetermined time from the head of the pilot PN code (after fifteen times continuous "0", if the pilot PN code is a code that "0" is added to the end of the M sequence code of degree 15, for example). To realize this, the timing which is offset for the predetermined time from the head of the pilot PN code is written in the start-up time register 77.

Figure 6:
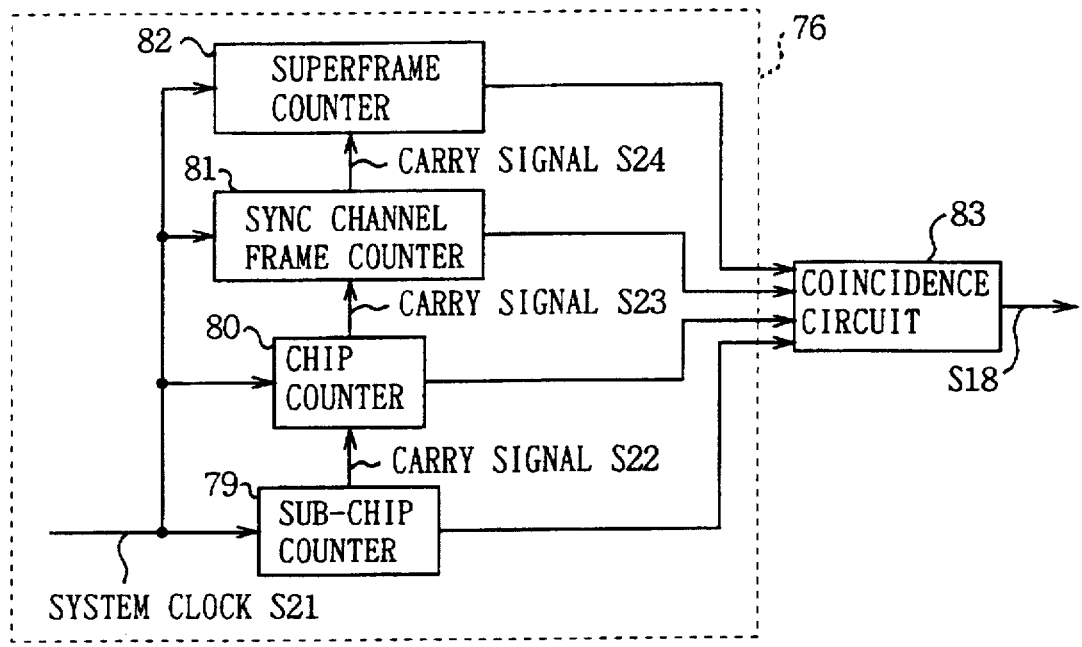
FIG. 6 is a block diagram showing the structure of a system time counter.

Here, FIG. 6 shows an example of the system time counter. As shown in FIG. 6, the system time counter 76 is composed of a sub-chip counter 79 for frequency-demultiplying a system clock S21 (e.g., 9.8 [MHz]); a chip counter 80 for further frequency-demultiplying the signal frequency-demultiplied by the sub-chip counter 79 in accordance with a carry signal S22; a sync channel frame counter 81 for further frequency-demultiplying the signal frequency-demultiplied by the chip counter 80 in accordance with a carry signal S23; a superframe counter 82 for frequency-demultiplying the signal frequency-demultiplied by the sync channel frame counter 81 in accordance with a carry signal S24.

In this case, a chip means the length of one code of PN code. Further, in this embodiment, the system clock S21, which is frequency-demultiplied to eight, corresponds to one chip. It means that the chip counter 80 counts the number of chips, the sync channel frame counter 81 counts the sync channel frame, and further the superframe counter 82 counts the superframe.

To start up the terminal itself at a timing of being offset for a regular time from the head of pilot PN code, the same value is constantly written in the character positions corresponding to the chip counter 80 and the sub-chip counter 79, in the timing for writing in the start-up time register 77. This is because, the code interval of the pilot PN code is equal to the interval of the sync channel frame, so that the same value is written in the character positions corresponding to the chip counter 80 and the sub-chip counter 79 which are under the character position of the sync channel frame thereby obtaining the timing of being offset for a regular time from the head of the pilot PN code.

In this way, the start-up timing which is offset for a regular time from the head of pilot PN code is written in the start-up time register 77, thereby the state of the pilot PN code generator 75 in re-starting is constantly fixed. Therefore, it is not necessary to load the different state in the pilot PN code generator 75 every time, so that the pilot PN code generator 75 is initialized into the fixed state and the circuit can be simplified.

In connection, in FIG. 5, the load signal S18 is directly output from the system time counter 76. However, in practice, as shown in FIG. 6, a coincidence circuit 83 is provided between the system time counter 76 and the register 74, and the load signal S18 is output from the coincidence circuit 83. The coincidence circuit 83 detects whether or not the output of the system time counter 76 coincides with the fixed value set previously, thereby outputs the load signal S18 which has the interval of integer times the code interval of the pilot PN code.

(3-2) Structure of Long Code PN Code generator

Figure 7:
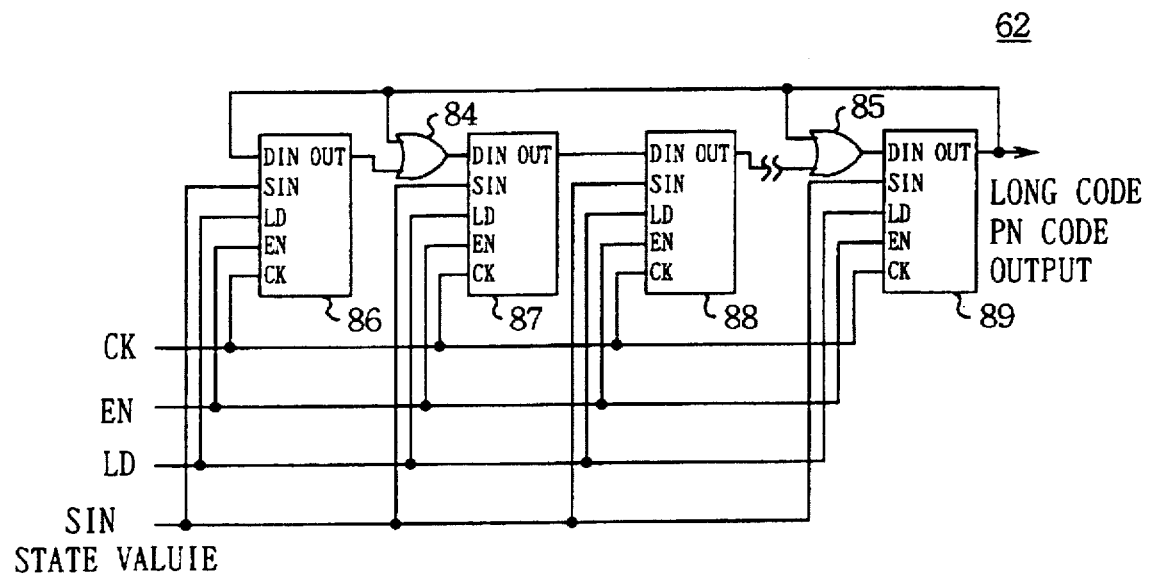
FIG. 7 is a block diagram showing the structure of a long code PN code generator.

In case of this embodiment, to temporally stop the long code PN code generator 62 and then drive it again from the predetermined state, as shown in FIG. 7, respective registers 86 to 89 in the long code PN code generator 62 (the long code PN code is a code of degree 42 and the number of registers is forty two) having an enable function and load function are used to load the initial value in accordance with the timeout of the timer 70, and to be an enable state.

Here, the operation of the long code PN code generator 62 will be explained using the timing charts of FIGS. 8A to 8D. The enable signal (EN) is the output of the flip-flop 72 shown in FIG. 5, which is active-high. The load signal (LD) is the pulse signal S17 output from the pulse generator 71 shown in FIG. 5, which is active-low.

In addition, FIGS. 8A to 8D show the case where the respective registers 86 to 89 of the long code PN code generator 62 operate by the falling of clock, and operate by the load input and the enable input of the synchronization type.

In the long code PN code generator 62, when the clock falls during the load signal is level "L", the state value is loaded to the respective registers 86 to 89 of the long code PN code generator 62 from the long code setting register 73. Then, when the clock falls in the state that both the load signal and the enable signal are level "H", it is sequentially updated to the next value. In this case, since the active of load signal is prior to the active of the enable signal, any state of the enable signal is permitted during the load signal is level "L".

In this way, in this embodiment, respective registers 86 to 89 in the long code PN code generator 62 having an enable function and load function are used, so that the long code PN code generator 62 is stopped by the control from the outside and it can be started again from the predetermined state.

With the above construction, in the mobile terminal equipment of this embodiment, in the case where the intermittent call reception is performed in a waiting time, the state value of the long code PN code generator 62 in next drive of the terminal is set to the long code setting register 73 to operate the timer 70, and the long code PN code generator 62, the pilot PN code generator 75, and the respective circuits of receiving system are stopped to enter the sleep state. Then, when the terminal starts by timeout of the the timer 70, the respective circuits of receiving system are started again, and at the same time, the long code PN code generator 62 is operated from the state value which has been set to the long code setting register 73 and further the pilot PN code generator 75 is operated from the initial state. Therefore, in the mobile terminal equipment of this embodiment, the long code PN code generator 62 or the pilot PN code generator 75 are stopped to perform the intermittent call reception, so that the power consumption in the intermittent call reception can be reduced significantly.

Further, according to the embodiment, the time interval of intermittent call reception is set by the value of integer times the pilot PN code, and the terminal is driven at a timing of being offset for a regular time from the head of the pilot PN code. Therefore, in re-starting, the initial value of the pilot PN code generator 75 becomes the fixed value to simplify the structure.

Further, according to the embodiment, the state value of the long code PN code generator 62 is periodically read out from the long code PN code generator 62 with interval of integer times the code interval of the pilot PN code, and the state value of the long code PN code generator 62 for next drive is calculated from the read state value. Therefore, the state value of the long code PN code generator 62 for next drive can be obtained easily and it can be realized to simplify the structure and reduce the power consumption.

With the above structure, when the intermittent call reception is performed in a waiting time, the state value of the long code PN code generator 62 in driving the terminal next is set to the long code setting register 73 to operate the timer 70. The long code PN code generator 62, the pilot PN code generator 75, and the respective circuits of receiving system are stopped to enter the sleep state. When the terminal drives by the timeout of the timer 70, the respective circuits of the receiving system are operated again, and at the same time, the long code PN code generator 62 is operated from the state value which has been set to the long code setting register 73, and further the pilot PN code generator 75 is operated from the initial state. Therefore, the long code PN code generator 62 or the pilot PN code generator 75 can be stopped to perform the intermittent call reception, and the power consumption in an intermittent call reception can be reduced significantly.

(4) Other Embodiments

The embodiments discussed above have dealt with the case where the state value of the long code PN code generator 62 is periodically read out from the long code PN code generator 62 with interval of the integer times the code interval of the pilot PN code, so that the state value of the long code PN code generator 62 for next driving is calculated from the read state value. However, this invention is not limited to this, but the state value of the long code PN code generator 62 is updated periodically with interval of the integer times the code interval of the pilot PN code on a software in the control circuit 66, and the state value of the long code PN code generator 62 for next drive can be calculated from the updated state value.

More specifically, the state value of the long code PN code generator 62 for next drive is obtained, not by periodically reading the state value of the long code PN code generator 62 as described in the above embodiment, but by periodically updating the state value on software. In this case, a method for updating can be realized by using the multiplication of matrix and vector shown in the above equation. G(n) being used here is a conversion matrix corresponding to the time interval for reading periodically.

Thus, reading circuitry of the register 74, etc., can be eliminated and the structure can be simplified accordingly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal in a communication system using a code division multiple access (CDMA) technique which uses a first spread code generated by a first spread code generating circuit and a second spread code generated by a second spread code generating circuit, said second spread code having a longer code interval than that of said first spread code, and which performs an intermittent call reception for call acquirement, said communication terminal comprising:

a receiving circuit;

an intermittent call reception controlling circuit for performing a sleep mode and an active mode, wherein said receiving circuit and said first and second spread code generating circuits for receiving a calling party's call are inactive in said sleep mode and active in said active mode;

a timer for selecting said sleep or said active mode; and a register for storing a state value of said second spread code generating circuit for a next driving condition thereof, whereby a change from said sleep mode to said active mode by said timer makes said receiving circuit and said first and second spread code generating circuits active, and said first spread code generating circuit is operated from an initial state value and said second spread code generating circuit is operated from said state value stored in said register.

2. The communication terminal according to claim 1, wherein said intermittent call reception controlling circuit drives said receiving circuit at a timing offset from a head of said first spread code, with a period of said intermittent call reception being an integer times said first spread code.

3. The communication terminal according to claim 1, wherein said intermittent call reception controlling circuit periodically reads out said state value of said second spread code generating circuit at intervals of an integer times the period of said first spread code, and calculates and updates said state value of said second spread code generating circuit for the next drive from said state value.

4. The communication terminal according to claim 1, wherein said intermittent call reception controlling circuit periodically updates said state value of said second spread code generating circuit at intervals of an integer times the period of said first spread code by a control software, and calculates and updates said state value of said second spread code generating circuit for the next drive from said updated state value.

5. The communication terminal according to claim 1, wherein said second code generating circuit includes an enable function and a load function for loading said state value at a predetermined timing, and loads said state value externally supplied in accordance with a timeout of said timer, and simultaneously enables said enable function to generate and update said second spread code.

6. A communication terminal in a communication system using a code division multiple access (CDMA) technique which uses a first spread code and a second spread code having a longer code interval than that of said first spread code, and which performs an intermittent call reception for call acquirement, said communication terminal comprising:

a receiving circuit;

a timer for performing said intermittent call reception using said receiving circuit by switching a sleep state or an active state at predetermined time intervals;

a memory circuit for storing in advance a state value of said second spread code for use in the next intermittent call reception; and an intermittent reception controlling circuit for generating and updating said second spread code based on said state value stored in said memory circuit and generating said first spread code based upon an initial state value when said receiving circuit of said communication terminal is switched to an active state by said timer.

7. The communication terminal according to claim 6, wherein the period of said intermittent call reception is an integer times the period of said first spread code, and wherein said intermittent reception controlling circuit puts said receiving circuit in said active state at a timing offset from a head of said first spread code.

8. The communication terminal according to claim 6, wherein said intermittent reception controlling circuit periodically reads said state value of said second spread code at intervals of an integer times the period of said first spread code, and calculates and updates said state value of said second spread code for the next call reception and stores it in said memory circuit.

9. The communication terminal according to claim 6, wherein said intermittent reception controlling circuit periodically updates said state value of said second spread code at time intervals of an integer times the period of said first spread code by a control software obtaining the state value of said second spread code for the next call reception and stores it in said memory circuit.

10. A communication method for use in a communication system using a code division multiple access (CDMA) technique which uses a first spread code and a second spread code having a longer code interval than that of said first spread code, and which performs an intermittent call reception to acquire a call from a calling party, said communication method comprising the steps of:

performing said intermittent call reception using a timer to place a receiving circuit of said communication terminal in a sleep state or in an active state at predetermined time intervals;

storing in advance a state value of said second spread code for use in the next call reception in a memory circuit; and generating in an intermittent reception controlling circuit a second spread code based on said state value of said second spread code stored in said memory circuit when said receiving circuit of said communication terminal is put in an active state by said timer; and generating in an intermittent reception controlling circuit a first spread code based on an initial state value to perform said intermittent call reception.

11. The communication method according to claim 10, wherein the period of said intermittent call reception is an integer times the code interval of said first spread code, and wherein said intermittent reception controlling circuit puts said receiving circuit in said active state at a timing offset from a head of said first spread code.

12. The communication method according to claim 10, wherein said intermittent reception controlling circuit periodically reads said state value of said second spread code at intervals of an integer times the period of said first spread code, and calculates and updates said state value of said second spread code for the next call reception and stores it in said memory circuit.

13. The communication method according to claim 10, wherein said intermittent reception controlling circuit periodically updates said state value of said second spread code at time intervals of an integer times the period of said first spread code by a control software obtaining the state value of said second spread code for the next call reception and stores it in said memory circuit.

* * * * *